United States Patent Office 3,474,046
Patented Oct. 21, 1969

3,474,046
FIRE RETARDANT POLYURETHANE COMPOSITION AND PROCESS OF PREPARING SAME
Paul E. Pelletier, Elmwood Park, and Floy Pelletier, Lockport, Ill., assignors, by mesne assignments, to Wyandotte Chemicals Corporation, a corporation of Michigan
No Drawing. Filed May 22, 1959, Ser. No. 814,994
Int. Cl. C08g 22/04, 22/44, 22/46
U.S. Cl. 260—2.5
7 Claims

ABSTRACT OF THE DISCLOSURE

Flame-retardant polyurethane resins and foams are prepared by using as an active hydrogen compound the reaction product of epichlorohydrin and a phosphorus acid.

---

The present invention relates to polyurethane compositions produced by reaction of polyisocyanates with halohydrin compounds produced by reaction of a phosphorus acid with a halogen-substituted aliphatic monoepoxide. The invention includes mixtures of polyisocyanates with halohydrin compounds as well as the polyurethane resins possessing improved resistance to burning and flame propagation which may be produced therefrom. Outstanding results are obtained when the polyurethane resin-producing reaction takes place in the presence of water or other blowing agent to produce polyurethane foams which are characterized by non-inflammability and the capacity to self-extinguish fires.

In accordance with the invention, a phosphorus acid, such as orthophosphoric acid, is reacted with a halogen-substituted aliphatic monoepoxide, such as epichlorohydrin, to provide halohydrin compounds reactable with polyisocyanates to form polyurethane resins. The halohydrin compounds are preferably at least substantially neutral so that reaction with polyisocyanates will proceed with greater regularity and rapidity to provide, particularly in foam products, superior physical characteristics.

Various phosphorus acids may be used, orthophosphoric acid being preferred. Pyrophosphoric acid and phosphorous acid also produce good results. Metaphosphoric acid as well as partial esters of the polyhdroxy phosphorus acids such as the mono- and di-esters of orthophosphoric acid, the mono-esters of phosphorous acid, and the mono-, di-, and tri-esters of pyrophosphoric acid, such as dimethyl acid pyrophosphate and ethyl acid phosphate, are also usable in the invention.

It is preferred to employ the selected phosphorus acid or mixture of acids in the absence of free water since water is independently reactive with the halogen-substituted monoepoxide so long as the reaction mixture is sufficiently acidic. However, the invention includes the presence of water in the reaction mixture as well as the presence of water or water-epoxide reaction product in the final product which is produced.

The halogen-substituted aliphatic monoepoxides which are preferred in accordance with the invention have the formula

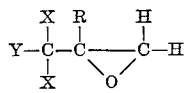

in which X is selected from the group consisting of hydrogen, halogen and organic, radicals free of functional groups reactive with the oxirane group of the epoxide, Y is a halogen and R is selected from the group consisting of hydrogen and organic radicals free of functional groups reactive with the oxirane group of the epoxide.

The perferred epoxide is epichlorohydrin. Other epoxides which may be used are illustrated by trichloromethylethylene oxide, α-methyl epichlorohydrin, epiiodohydrin, epifluorohydrin, epibromohydrin, β-heptylepichlorohydrin, α-cyclohexylepichlorohydrin, β-phenylepibromohydrin and α-allylepichlorohydrin.

It is known as taught, for example, in United States Patent 2,372,244, to react phosphoric or phosphorous acids with olefin oxides to produce reaction products possessing primary hydroxyl groups as indicated by the reaction equations set forth in said patent.

The products of the invention are very different from those of Patent 2,372,244 since when sufficient propylene oxide is reacted with phosphoric acid or phosphorous acid (about 6 mols per mol of acid) to produce a neutral product sufficiently reactable with polyisocyanates for polyurethanes foam production, the foam product is not self-extinguishing or non-inflammable. Using epichlorohydrin in accordance with the invention to provide a halohydrin compound containing both hydroxyl groups and chlorine substituents enables the provision of at least substantially neutral products which are reactive with polyisocyanates to form non-inflammable and self-extinguishing polyurethane foams.

At least 1 mol of halogen-substituted monoepoxide is reacted with each mol of phosphorus acid and, in accordance with the preferred practice of the invention, sufficient total aliphatic monoepoxide (halogen-substituted or not) is reacted with the phosphorus acid to provide an at least substantially neutral halohydrin compound. Thus, and using orthophosphoric acid as illustrative, the reaction of about 5 or more mols of epichlorohydrin with orthophosphoric acid produces a neutral halohydrin compound reactable with polyisocyanates to provide a satisfactory self-extinguishing polyurethane foam. When from 1 to about 4 mols of epichlorohydrin is reacted, the polyurethane foam does not possess the superior physical characteristics provided when about 5 or more mols of epichlorohydrin are used, but the foam product is self-extinguishing. However, reacting 3 mols of epichlorohydrin with 1 mol of orthophosphoric acid followed by reacting 3 mols of an olefin oxide such as ethylene oxide, propylene oxide, 1,2-butylene oxide or any monoepoxide compound having the 1,2 oxirane group, such as styrene oxide, with the initial acidic epichlorohydrin-phosphoric acid reaction product provides a chlorohydrin compound which will yield a satisfactory self-extinguishing polyurethane foam of superior physical characteristics.

The chlorohydrin compounds of the invention may be used alone for reaction with polyisocyanates or in admixture with other compounds reactable therewith such as hydroxyl-containing polyesters and polyethers. Whatever proportion of the chlorohydrin compounds of the invention is used in the mixture provides an improvement in fire resistance, and it is preferred to use enough to provide self-extinguishing character to the foam product.

Referring to the production of the phosphorus-containing halohydrin compounds of the invention, the temperature of reaction can vary from 50° F. to 500° F. Low temperature operation, while possible, is inconvenient because the reaction is exothermic. At temperatures above 220° F., the product darkens and is less desirable, though still useful. Preferred temperatures are from 140°–190° F., providing an easily controlled reaction without darkening of the product. For convenience, atmospheric pressure is used, but this is not essential. When operating at temperatures above the boiling point of the reactants, the use of pressure is necessary and permissible, e.g., above 243° F. for epichlorohydrin.

The reaction is preferably effected by incremental addition of the substituted monoepoxide to the hot phosphorus acid, though this is not essential, the rate of addi-

3 tion being established by the cooling efficiency available and the reaction temperature desired.

The invention is illustrated in the following examples:

EXAMPLE I 17.85 mols of epichlorohydrin were added to 3.56 mols of 100% orthophosphoric acid in a 2 liter, 3 neck flask provided with a reflux condenser and agitating means, the flask being set up in a cooling bath. A reaction temperature of 160–180° F. was maintained during addition of the epichlorohydrin. The reaction temperature was maintained at the initial stages of reaction by water cooling. After addition of epichlorohydrin, the product was held at 200° F. for 2 hours to complete the reaction. The product was then heated in an inert atmosphere under vacuum to remove any remaining epichlorohydrin. A nearly quantative yield of 1995 grams was obtained. The product is a clear, slightly yellow liquid, essentially neutral on titration with sodium hydroxide. The product is insoluble in water but soluble in methyl and isopropyl alcohol and has a hydroxyl number of 300 which corresponds with the combination of 5 mols of epichlorohydrin per mol of orthophosphoric acid.

EXAMPLE II 7.98 mols of epichlorohydrin were added to 2.66 mols of 100% orthophosphoric acid, the reaction conditions being the same as those specified in Example I. The product was then held at 180° F. for 1 hour to complete the reaction. A quantative yield of 1000 grams was obtained. The product is a clear, slightly yellow liquid having a pH of 1.5, insoluble in water but soluble in ethyl alcohol.

EXAMPLE III

To the product of Example II, 450 grams of ethylene oxide were added under a pressure of 10–30 centimeters of mercury, and the reaction temperature was maintained at 90–120° F. by means of water cooling. After addition of ethylene oxide, the reaction temperature was increased slowly to 170° F., and this reaction temperature was maintained for 1½ hours. Vacuum was then applied to remove free oxide. The final yield was 1425 grams of a clear, faintly yellow colored liquid product which was free of acid and possessed a hydroxyl number of 290 (acetylation method).

EXAMPLE IV

A typical foaming composition was prepared using the halohydrin compound obtained in Example I as follows:

Quasi prepolymer composition 14.5 parts—Halohydrin compound of Example I.
58.00—Tolylene diisocyanate (80/20 mixture of the 2,4 and 2,6 isomers).
(React at 200° F. for 1 hour; cool to 70° F. and cap in moisture free container; viscosity at 80° F., cps.; analyzed NCO=32.)
27.5 parts—Trichlorofluoromethane (blowing agent).

Resin-accelerator composition 99.2–96.7—Halohydrin compound of Example I (Phosphoric epichlorohydrin adduct).
.3–1.8—Triethyl amine.
.5–1.5—Wetting agent: Silicone X-520 (Union Carbide & Carbon) a dimethyl end-blocked silicone.

Foaming composition 54.4 parts—Quasi prepolymer.
45.6 parts—Resin-accelerator mixture.

The composition set forth above produces a very fine celled, brittle foam which is completely non-inflammable. The product possesses only limited tensile strength and load-bearing properties.

It has been found that if 85 to 40 parts of the halohydrin compound of Example I are mixed with 15 to 60 parts of a typical adipate-glycol polyester, or polyethers, having a hydroxyl number in the range of 250 to 700, the preferred being 450 to 480, non-burning foams of vastly improved physical properties can be produced. A typical example is as follows:

EXAMPLE V

Resin-catalyst mixture 49.25—Halohydrin compound of Example I.
49.25—Adipic acid-ethylene glycol polyester (hydroxyl number 480).
.7—Triethyl amine.
.8—Wetting agent: Silicone X-520 (Union Carbide & Carbon).

Foam composition 54.4 parts—Quasi prepolymer of Example IV.
45.6 parts—Resin catalyst mixture of this example.

The foam produced is a self-extinguishing, fine celled, tough, rigid material. The load bearing properties, tensile strength and shear strength are vastly superior to the foam produced in Example IV.

EXAMPLE VI

Examples IV and V were repeated using the halohydrin compound of Example II instead of the halohydrin compound of Example I. The foaming reaction did not run as smoothly as it did in Examples IV and V, but self-extinguishing foams were produced although the fine cell structure and uniform physical properties achieved in Examples IV and V were not duplicated, and the self-extinguishing character of the Example IV and V products was superior to those produced in the present example.

EXAMPLE VII

Examples IV and V were repeated using the halohydrin compound produced in Example III. Results approximately corresponding to those produced in Examples IV and V were achieved although the self-extinguishing character of the foam products produced in Examples IV an V were somewhat superior to those produced by the present Example.

Whereas orthophosphoric acid has been used as illustrative in the examples set forth, the various other phosphorus acids referred to may be substituted for the orthophosphoric acid of the examples by employing an equivalent weight of the selected phosphorus acid based on the hydroxy groups in the phosphorus acid molecule. Further, the examples employ orthophosphoric acid in the absence of water, and this is preferred. However, water may be tolerated, preferably but not necessarily in an amount not exceeding the weight of phosphorus acid present in the reaction mixture.

It will be understood that the production of polyurethane foam may be accomplished in various ways known to the art, the foam production illustrated in Examples IV, V, VI and VII being simply illustrative. In this regard, reference is made to the text entitled "Polyurethanes" by Bernard A. Dombrow, published by Reinhold Publishing Corporation, 1957, where reference is made to various techniques for the production of polyurethane foams, including the "one-shot" procedure as well as various procedures including polyurethane prepolymers.

In a foam producing mixture in accordance with the invention, the stated presence of a polyisocyanate component is intended to include the polyisocyanate compound per se., such as tolylene diisocyanate, or a reaction product of the polyisocyanate which liberates free polyisocyanate when heated, such as a compound with phenol, or a quasi prepolymer of the monomeric polyisocyanate which propides isocyanate polyfunctionality, such as the prepolymers illustrated in the present examples.

As is conventional, the foaming composition includes a blowing agent. This term includes various types of materials which are known to possess an expanding function. Thus, water reacts with isocyanate to produce carbon dioxide gas thereby providing a blowing agent which enters into the polymerization reaction providing an internal blowing agent. External blowing agents which expand or decompose to yield gaseous products, normally upon increase in temperature, may also be used. These are termed external agents because they do not enter into the isocyanate polymerization reaction. External blowing agents are illustrated by the materials generally known as Freons which are lower molecular weight hydrocarbons usually containing both fluorine and chlorine substitutents. Other external blowing agents are illustrated by sodium and ammonium bicarbonate, etc.

As is generally accepted in the urethane art when preparing a foam the equivalents of isocyanate are preferably approximately equal to the equivalents of hydroxyls (or other radicals) designed to react with the isocyanate to produce the urethane polymer. The ratio of isocyanate to hydroxyl can vary considerably in accordance with the invention in the same manner as is known for the conventional hydroxyl-containing materials known to the art.

Any isocyanate will react with the halohydrin compounds of the invention such as tolylene diisocyanate (pure or mixed isomers), hexamethylene diisocyanate, 1, 5 naphthalene diisocyanate, methylene bis - 4 - phenyl isocyanate, etc., however the preferred isocyanates are the various commercial tolylene diisocyanates because of their availability and desirable physical properties which are well understood by the art.

Various polyesters or polyethers having an hydroxyl number in the range of 250 to 700 may be used in admixture with the halohydrin compounds of the invention to provide foam products of improved physicalp roperties. Polyesters of polycarboxylic acids with polyols such as glycols (the glycol in excess to provide hydroxyl functionality) have already been illustrated. Polyethers may also be used such as higher molecular weight epoxy resins in which the repeating unit contains secondary hydroxyl groups. Similarly esters of these epoxy regins in which the epoxy groups are reacted but the hydroxyl groups are unreacted are also suitable.

The invention is defined in the claims which follow.

We claim:
1. A fire-retardant polyurethane resin comprising the reaction product of an organic polyisocyanate and an at least substantially neutral halohydrin reaction product of a halogen-substituted aliphatic monoepoxide having the formula:

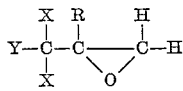

in which X is selected from the group consisting of hydrogen, halogen and organic radicals free of functional groups reactive with the oxirane group of the epoxide, Y is a halogen and R is selected from the group consisting of hydrogen and organic radicals free of functional groups reactive with the oxirane group of the epoxide with a phosphorus acid, said halohydrin reaction product containing at least 1 mol of reacted halogen-substituted monoepoxide per mol of said acid.

2. The fire-retardant polyurethane resin of claim 1 in which said phosphorus acid is selected from the group consisting of orthophosphoric acid, pyrophosphoric acid, metaphosphoric acid, phosphorous acid and partial esters thereof.

3. The fire-retardant polyurethane resin of claim 1 in which said at least substantially neutral reaction product contains at least 5 mols of epichlorohydrin reacted with 1 mol of orthophosphoric acid.

4. The fire-retardant polyurethane resin of claim 3 in which said organic polyisocyanate comprises tolylene diisocyanate and said diisocyanate and said at least substantially neutral reaction product are present in approximately equivalent amounts.

5. The fire-retardant polyurethane resin of claim 1 in the form of a foam.

6. A process of producing a fire-retardant polyurethane foam consisting of co-reacting a mixture comprising an organic polyisocyanate, a blowing agent, and an at least substantially neutral halohydrin reaction product of a halogen-substituted aliphatic monoepoxide having the formula:

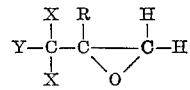

in which X is selected from the group consisting of hydrogen, halogen and organic radicals free of functional groups reactive with the oxirane group of the epoxide, Y is a halogen and R is selected from the group consisting of hydrogen and organic radicals free of functional groups reactive with the oxirane group of the epoxide with a phosphorus acid, said halohydrin reaction product containing at least 1 mol of reacted halogen-substituted monoepoxide per mole of said acid.

7. A fire-retardant polyurethane resin comprising the reaction product of (A) an organic polyisocyanate and (B) the reaction product consisting of the reaction of epichlorohydrin with a phosphorus acid.

References Cited

UNITED STATES PATENTS

| | | | |
|---|---|---|---|
| 2,764,565 | 9/1956 | Hoppe et al. | 260—2.5 |
| 2,770,610 | 11/1956 | Hardy et al. | 260—34 |
| 2,906,642 | 9/1959 | Dennis | 260—2.5 |

OTHER REFERENCES

Zetzche et al., "Helv. Chem. Acta.," 1962, vol. 9, pp. 708–714.

DONALD E. CZAJA, Primary Examiner

M. B. FEIN, Assistant Examiner

U.S. Cl. X.R.

260—2, 75, 77.5, 858, 920, 953